April 28, 1953     A. JOHNSON     2,636,545
SEAT SLIDE LATCHING MECHANISM
Filed May 15, 1950     2 SHEETS—SHEET 1
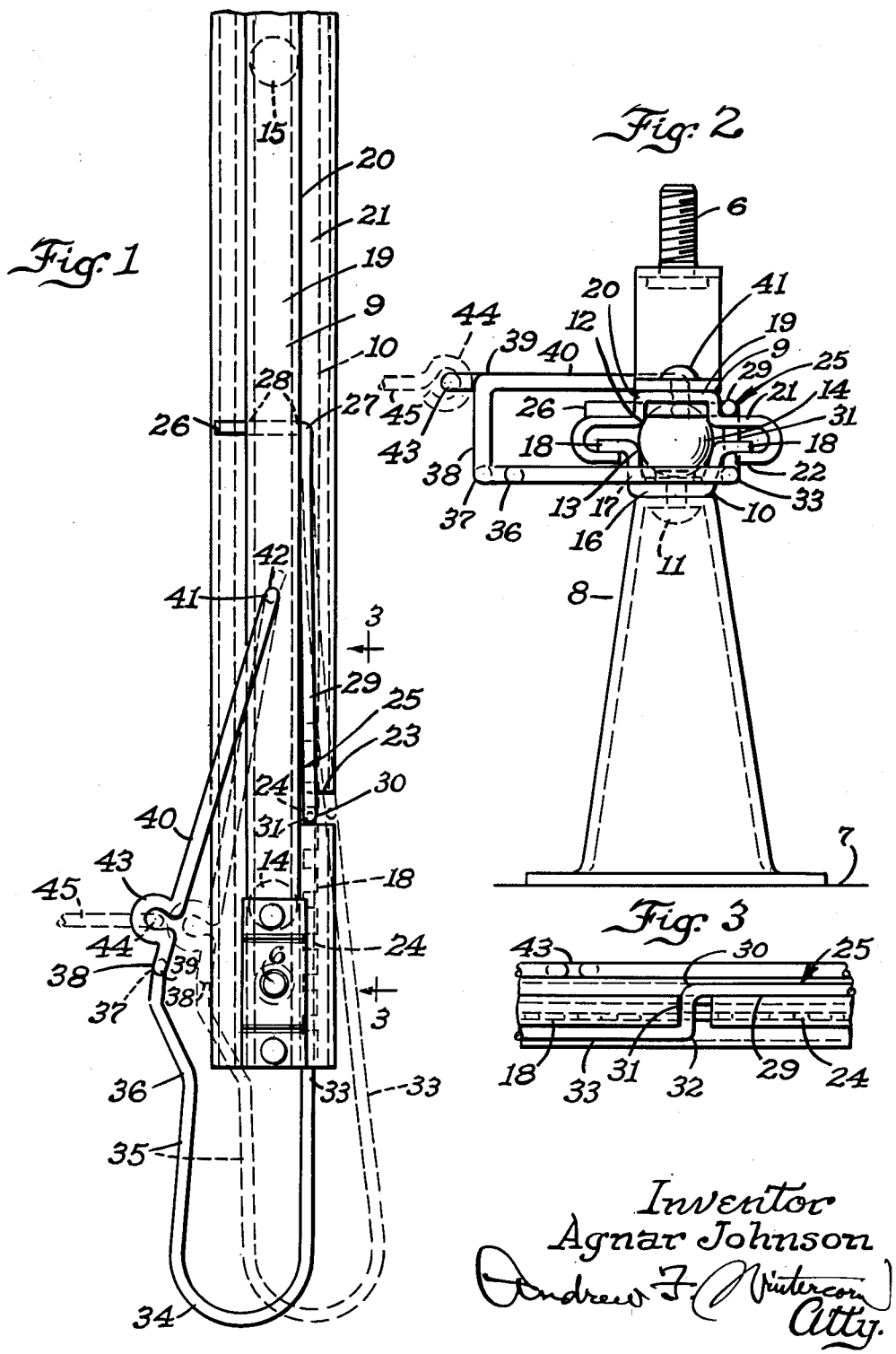
Inventor
Agnar Johnson
Andrew F. Wintercorn
Atty.

April 28, 1953          A. JOHNSON          2,636,545
SEAT SLIDE LATCHING MECHANISM
Filed May 15, 1950          2 SHEETS—SHEET 2
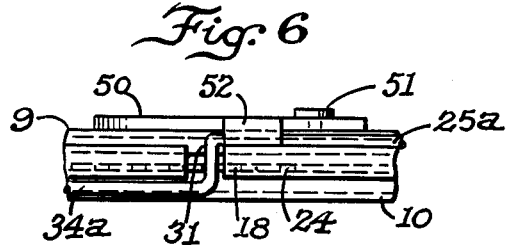
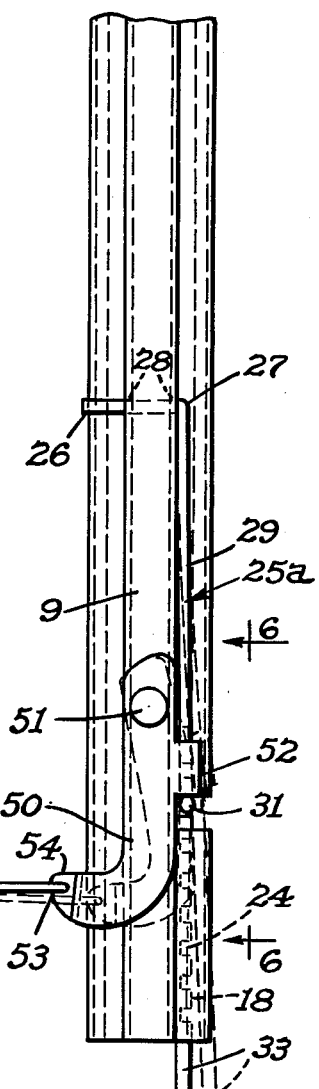
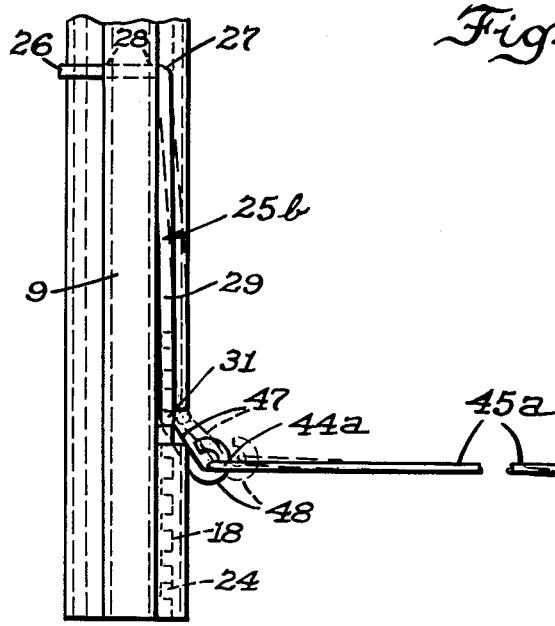
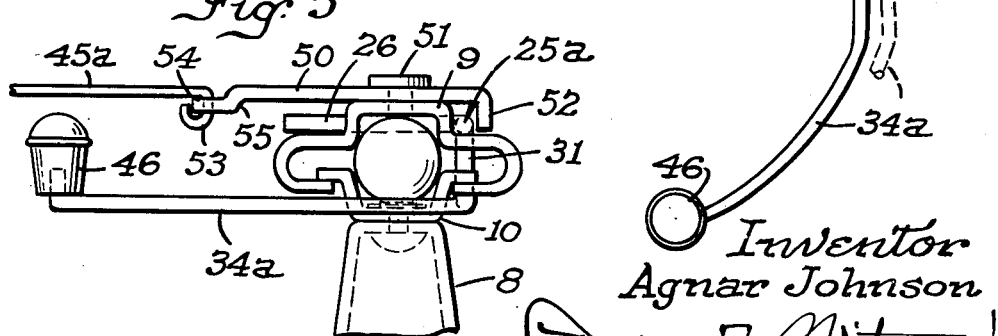
Inventor
Agnar Johnson Patented Apr. 28, 1953

2,636,545

UNITED STATES PATENT OFFICE 2,636,545

SEAT SLIDE LATCHING MECHANISM

Agnar Johnson, Rockford, Ill., assignor to Atwood Vacuum Machine Company, Rockford, Ill., a corporation of Illinois Application May 15, 1950, Serial No. 162,092

11 Claims. (Cl. 155—14)

This invention relates to seat slides adapted for use in vehicles such as automobiles, and is more particularly concerned with improvements in the latching mechanism provided for releasably locking such slides in adjusted positions.

Various kinds of latches and latch operating means have been proposed heretofore. For example, there have been the sliding type latches like those illustrated in Crabb Patent 2,271,913, and there have also been the pivoted type latches like those shown in Lustig Patent 2,234,442. Other types have also been proposed but the sliding type and the pivoted type have been most commonly used. In all prior designs a separate spring means was invariably provided to hold the latch normally in locking position, and, of course, manually operable handle means of one kind or another was required which had to be connected in a suitable manner with the latch means and had to be so arranged that it could be operated reasonably handily from the driver's position on the seat. In any event, these prior designs have been more or less complicated and expensive and were subject to the further objection that with so many intermediate connections there was apt to be too much lost motion in the structure to enable as positive operation as desired, particularly when it is remembered that the movement of the latch on one slide mechanism on one end of the seat has to be transmitted through an intermediate linkage of some kind to the latch on the slide mechanism on the other end of the seat, thus adding further opportunities for additional lost motion, and, of course, the fact that sheet metal stampings are used to such a large extent in the large scale production of seat slides for automotive use makes it impossible to operate within close limits as to tolerances, so that the difficulties mentioned are accordingly multiplied. It is therefore the principal object of my invention to provide a spring wire latch of simplified and novel design which, besides costing only a small fraction of what was involved in the cost of these other designs, avoids the objections inherent in those other designs and enables much more positive operation of the latches on the opposite ends of a seat, not only due to the improved design of the latches themselves but because of the greatly reduced opportunities for lost motion going with the use of these improved spring wire latches.

In the spring wire latches of my invention the spring wire body of the latch furnishes its own spring action, thus eliminating the necessity for extraneous spring means, and moreover, in the case of the latch on the slide mechanism under the driver's end of the seat, the handle for operating the latch is preferably formed as an integral extension of the front end portion of the latch, thereby eliminating an extra handle and the mounting therefor, although, of course, a separate operating handle unit may be provided if preferred.

In accordance with my invention, in view of the springiness of the spring wire latch and the possibility therefore that an operator with unusual strength might spring the latch to an excessive degree and possibly disengage and dislocate it from its intended assembled relationship to the notched portion of the slide through which a portion of the spring wire latch must extend for engagement in a selected notch in the stationary seat slide element, I prefer to provide means for positively limiting the disengaging movement of the spring wire latch in the vicinity of the notched portion of the movable slide element on which the spring wire latch is carried, and this limiting means preferably also is connected with the spring wire latch in the slide mechanism at the other end of the seat so as to disengage that latch automatically simultaneously with the disengagement of the first latch.

The invention is illustrated in the accompanying drawings in which—

Fig. 1 is a plan view of a seat slide assembly showing applied thereto a spring wire latch made in accordance with my invention;

Fig. 2 is a front end view of Fig. 1;

Fig. 3 is a fragmentary side elevation of Fig. 1 taken on the line 3—3 thereof;

Fig. 4 is a plan view similar to Fig. 1 but showing a modified or alternative construction in so far as the spring wire latch is concerned and showing moreover a novel means for limiting the throw of the first latch and the utilization of this means for operation of the companion latch on the other seat slide assembly on the other end of the seat;

Fig. 5 is an end view of the seat slide assembly appearing on the right in Fig. 4, and Fig. 6 is a fragmentary side elevation of Fig. 4 taken on the line 6—6 thereof.

Similar reference numerals are applied to corresponding parts throughout the views.

Referring first to Figs. 1 and 2, I have shown my invention applied to a ball-bearing type seat slide assembly similar to that disclosed in my copending application, Serial No. 687,886, filed August 2, 1946, there being, of course, two such devices provided in connection with each seat attached to the bottom of the seat by means of bolts 6 or in any other suitable manner, and secured to and supported upon the floor 7 on the legs or brackets 8, suitably of hollow sheet metal construction, provided on the front and rear ends of the seat slide structure. Each seat slide structure comprises upper and lower longitudinally extending channel slide members 9' and 10, the member 9 carrying the bolts 6 previously mentioned and the member 10 being secured in any suitable manner to the tops of the supporting brackets 8, as by rivets 11. The slide members 9 and 10 are of stamped sheet metal construction and formed to provide channels 12 and 13 therein in which two bearing balls 14 and 15 operate to maintain these slide members in a normal spaced relationship and also guide the upper slide member 9 for movement in a straight line relative to the lower slide member 10. The lower member 10 has the rivets 11 entered through the web portion 16 of the channel 13 and has the side walls 17 of the channel bent outwardly to provide longitudinally extending flanges 18. In a similar way, the upper slide member 9 has the bolts 6 anchored in the web portion 19 of the channel 12 and has the side walls 20 of the channel bent outwardly to define longitudinally extending flanges 21, the outer edge portions of which are bent inwardly, as indicated at 22, under the flanges 18 on the lower slide member 10 to hold the parts in assembled relation. The seat slide constructed so far described is substantially as disclosed in the copending application. However, in the present case, a notch 23 is defined by cutting away a small portion of the flange 21 on one side of the upper slide member 9 so as to expose selectively any one of the notches 24 provided in longitudinal spaced relation in the edge of the corresponding flange 18, whereby to enable engagement of the spring wire latch 25 selectively in any one of these notches 24 to lock the seat in any desired position of adjustment.

The spring wire latch 25, in accordance with my invention, is made from a single length of spring wire having one horizontal end portion 26 bent at right angles as at 27 and entered with a press fit in registering holes 28 provided in the side walls 20 of the channel 12 for anchorage of the rear end of the latch on the upper slide 9. The latch 25 extends forwardly from its anchored end 26 along the outside of the channel 12 as indicated at 29 to the notch 23 at which point the latch has a right angle bend as indicated at 30 to provide a short vertically extending latch pin portion 31 engageable in any one of the notches 24 in flange 18. There is another right angle bend at 32 in the spring wire latch 25 to define the lower end of the latch pin portion 31, and the latch 25 extends forwardly from this bend 32 along the outside of channel 13 and extends forwardly from the front end of the seat slide structure enough to form one side of a U-shaped handle loop or bail 34 by means of which the spring wire latch may be operated by sidewise pressure on the handle 34 so as to flex the latch 25 as a whole between the handle 34 and the anchored rear end 26 of the latch, as indicated in dotted lines. The latch pin portion 31 is spaced far enough from the anchored end 26 to allow this pin portion 31 to be withdrawn fairly easily from whichever one of the notches 24 it happens to be engaged in at the time, so that the seat may be slid forwardly or rearwardly to the desired extent whereupon the pin portion 31 will, after the handle 34 is released, snap into the first notch 24 that is brought into register with it, under the spring tension inherent in the spring wire latch itself. The side 35 of the handle 34 extends rearwardly in substantial parallelism with the other side 33 of the handle to the point 36 where it has a lateral bend and then an upward bend as at 37 so as to define a substantially vertical stop pin portion 38 that is adapted to come into engagement with the adjacent side of the upper slide 9 positively to limit the lateral deflection of handle 34 in the release of the latch to the extent that although the latch pin portion 31 is assured of disengagement from the cooperating notch 24, the latch pin portion 31 is nevertheless still disposed within the confines of the notch 23, as indicated in dotted lines in Fig. 1, so that there is no danger of the operator dislocating the spring wire latch from its proper assembled relationship to the rest of the seat slide structure and rendering it inoperative. The spring wire latch is therefore fool-proof. There is a right angle rearward bend 39 defining the upper end of the stop pin portion 38 and the spring wire extends horizontally rearwardly at an acute angle with relation to the upper slide 9 as indicated at 40 and has a right angle bend in the extremity thereof to define a downwardly extending vertical pivot pin portion 41 which pivots in a hole 42 in the web 19 of the channel 12, this hole 42 being spaced forwardly appreciably from the holes 28 receiving the anchored rear end portion 26 of the latch. An eyelet portion 43 is formed in the spring wire at a predetermined distance from the pivot pin portion 41 for connection with the looped end 44 of a cross link 45 that ties together the spring wire latches 25 provided on the two seat slide structures supporting the opposite ends of an automobile seat. The companion latch 25 to the one appearing in Fig. 1 may or may not be equipped with the handle extension 34.

In operation, these spring wire latches 25 can be assembled on a seat slide structure with much less difficulty and at a small fraction of the cost involved with other designs of latch mechanisms, there being only the press fit insertion of the end portion 26 in holes 28 and the entry of the pivot pin portion 41 in the hole 42, and, of course, the one-piece bent spring wire forming the body of the latch costs a small fraction of what was involved in the cost of the plurality of parts invariably required with other designs. Moreover, with the present one-piece construction, there is eliminated the various pivotal connections, all of which involved a certain amount of play, and this latch can accordingly be fitted more accurately to the seat slide structure with less opportunity for runout in the large scale production of such structures for use on automobiles. The elimination of extra parts and the consequent elimination of lost motion going with the connections between such parts accounts for the more positive action of this spring wire latch, and yet, since there is only the inherent spring tension in the latch itself to be overcome in the release of the latch, there being no such friction as was involved in the sliding movement of a reciprocable latch or the turning movement of an oscillating latch, it follows that the present latch may be operated much more easily. The inherent spring tension holding the present spring wire latch normally in its locked position keeps the latch fully engaged at all times, and inasmuch as there are no extraneous parts which are not affected by this spring tension, it is evident that there will be no likelihood of the latch rattling when the car is in motion.

In the construction shown in Figs. 4, 5 and 6, spring wire latches 25a and 25b are illustrated, which operate similarly as latch 25. The same type of seat slide structures have been shown, to facilitate the understanding of the operation of this modification. Latch 25a has the anchored end 26 like latch 25 and extends forwardly along the outside of the upper slide, as indicated at 29, and has the downwardly extending latch pin portion 31 received in whichever notch 24 in flange 18 is in register with it, the latch having the portion 33 extending forwardly from the latch pin portion 31 alongside the outside of the lower slide 10 and projecting forwardly from the front end of the seat slide structure to provide the handle portion 34a, on the extremity of which a knob 46 is preferably provided to facilitate manual operation of the latch 25a. Latch 25b has the anchored end portion 26 like latch 25 and 25a and has the forwardly extending portion 29 disposed alongside the outside of the upper slide 9, and it has the downwardly extending latch pin portion 31 engageable in whichever notch 24 in flange 18 happens to be in register with it. However, latch 25b differs from the others at this point in having a lateral extension 47 from the lower end of the latch pin portion 31, in the outer end of which a loop 48 is formed for connection with the loop 44a in the adjacent end of the cross-link 45a provided to interconnect the latches 25a and 25b for joint operation. In other words, a latch like latch 25b could be operated by direct connection with the companion latch on the other seat slide structure at the other end of the seat in the manner described above in regard to the companion latch for latch 25, namely, by connection of link 45a directly with the companion latch, as by connection with a loop 43 on the companion latch, as shown in Figs. 1 and 2. However, in Figs. 4 and 5 I have shown an intermediate member 50 pivoted at 51 on top of slide 9 adjacent latch 25a and arranged to be oscillated about its pivot 51 in the release of latch 25a to give reciprocatory movement to link 45a so as to release latch 25b with latch 25a, the intermediate member 50 serving moreover as a means for positively limiting deflection of spring wire latch 25a in a release direction. In other words, the oscillatable member 50, which, of course, could be used without any connection with a cross-link 45a, serves a similar purpose as the stop pin portion 38 on latch 25. There is a downwardly projecting lug 52 on one edge portion of member 50 arranged to be engaged by the portion 29 of spring wire latch 25a in the release movement so as to swing the member 50 in a counter-clockwise direction as viewed in Fig. 4, thereby causing link 45a, which is pivotally connected as at 53 to a lug 54 on the other side of the member 50, to be pulled to the right and accordingly disengage spring wire latch 25b. Now, the lug 54 is offset downwardly from the plane of member 50 as indicated at 55 in Fig. 5 whereby to form a limit stop which by engagement with the adjacent side of the upper slide 9 will positively limit the counter-clockwise movement of member 50 with latch 25a and accordingly positively limit the deflection of latch 25a, for the same reasons outlined above in regard to latch 25. Of course, the fact that the movement of latch 25a is limited means a corresponding limit upon movement of latch 25b so that neither of the two latches can become dislocated from proper assembled relationship to the associated seat slide structure.

The operation of the construction shown in Figs. 4 to 6 is believed to be clear from the foregoing and particularly in view of the description of the operation of the structure shown in Figs. 1 to 3, similar advantages being obtained with both constructions.

It is believed the foregoing description conveys a good understanding of the objects and advantages of my invention. The appended claims have been drawn to cover all legitimate modifications and adaptations.

I claim:

1. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, and manually operable means comprising an integral handle extension extending substantially horizontally from the end of the latch pin portion away from the fixed end of said latch member lengthwise of the singly-notched element and beyond the end thereof for deflecting said latch member laterally out of and into notches in the other of said support and slide elements.

2. Latching means as set forth in claim 1 including means for positively limiting lateral deflection of said latch member so as to prevent disengagement of the substantially vertically extending latch pin portion from the notch in the singly-notched element.

3. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly-notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member, manually operable means for deflecting said latch member, and means for positively limiting deflection of said latch member; comprising an integral extension of said latch member and including a stop portion arranged to strike one of the support and slide elements at the limit of deflection of said latch member.

4. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another; said latching means comprising a substantially horizontal elongated spring wire latch member fixed at its one end to the singly-notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith; said latch pin portion being held releasably lockingly engaged in the latter notch under the spring tension inherent in the spring wire material of said latch member and adapted to be moved to released position by deflection of said latch member, manually operable means for deflecting said latch member; the last mentioned means comprising an integral handle extension extending substantially horizontally from the end of said latch pin portion; and the handle extension having an integral stop portion provided thereon arranged to engage one of the support and slide elements upon a predetermined deflection of said latch member to positively limit deflection thereof.

5. Latching means for releasably locking a movable seat supporting slide in a selected position relative to a stationary support on which the slide is guided for fore and aft reciprocation; one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly-notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member; manually operable means for deflecting said latch member; and means for positively limiting deflection of said latch member, comprising a stop member movably supported on the singly notched one of said support and slide elements, having one projection arranged to be engaged by said latch member in the deflection thereof to transmit movement to said stop member, and having another projection arranged to engage said singly notched element to limit movement of said stop member.

6. Latching means for releasably locking a movable seat supporting slide in a selected position relative to a stationary support on which the slide is guided for fore and aft reciprocation, one of the said support and slide elements having a plurality of longitudinally spaced notches provided in an edge portion thereof and the other of said elements having a single notch provided therein arranged to register with any one of said plurality of notches upon reciprocatory movement of said elements relative to one another, said latching means comprising a substantially horizontal elongated spring wire latch member fixed at its one end to the singly-notched one of said support and slide elements at some distance from the notch and extending lengthwise of said element toward the notch and having a substantially vertically extending integral latch pin portion disposed freely in the notch and closely engaging in whichever one of the plurality of notches in the other of said elements is in register therewith, said latch pin portion being held releasably lockingly engaged in the latter notch under the spring tension inherent in the spring wire material of said latch member and adapted to be moved to released position by deflection of said latch member; manually operable means for deflecting said latch member; and means for positively limiting deflection of said latch member, comprising a stop member movably supported on the singly notched one of said support and slide elements, having one projection arranged to be engaged by said latch member in the deflection thereof to transmit movement to said stop member, and having another projection arranged to engage said singly notched element to limit movement of said stop member; the latching means including means adapted to be connected with the stop member for movement therewith and adapted to be connected with another latch member on another seat slide assembly to operate the same.

7. As an article of manufacture, a spring wire latch member for releasably locking a seat supporting slide in slidably adjusted relation to a stationary support, said latch member comprising an elongated substantially horizontal spring wire body having one integral end portion bent laterally to form a substantially horizontal supporting end portion adapted for rigid connection with the slide, and having another integral portion spaced appreciably from said end portion bent downwardly to form a substantially vertical latch pin portion adapted to have releasable locking engagement in notches provided in the support, the free end portion of said latch pin portion being bent forwardly to form a substantially horizontal operating end portion by means of which the latch member is adapted to be deflected to release it from locking engagement with the support.

8. As an article of manufacture, a spring wire latch member for releasably locking a seat supporting slide in slidably adjusted relation to a stationary support, said latch member comprising an elongated substantially horizontal spring wire body having one integral end portion bent laterally to form a substantially horizontal supporting end portion adapted for rigid connection with the slide, and having another integral portion spaced appreciably from said end portion bent downwardly to form a substantially vertical latch pin portion adapted to have releasable locking engagement in notches provided in the support, the free end portion of said latch pin portion being bent forwardly to form a substantially horizontal operating end portion by means of which the latch member is adapted to be deflected to release it from locking engagement with the support, the operating end portion being extended to include a handle portion adapted to project forwardly from the seat for manual operation.

9. As an article of manufacture, a spring wire latch member for releasably locking a seat supporting slide in slidably adjusted relation to a stationary support, said latch member comprising an elongated substantially horizontal spring wire body having one integral end portion bent laterally to form a substantially horizontal supporting end portion adapted for rigid connection with the slide, and having another integral portion spaced appreciably from said end portion bent downwardly to form a substantially vertical latch pin portion adapted to have releasable locking engagement in notches provided in the support, the free end portion of said latch pin portion being bent forwardly to form a substantially horizontal operating end portion by means of which the latch member is adapted to be deflected to release it from locking engagement with the support, the operating end portion being extended to include a handle portion adapted to project forwardly from the seat for manual operation, the handle portion including a rearwardly bent end portion having a downwardly bent extremity adapted to be pivotally engaged on the slide.

10. As an article of manufacture, a spring wire latch member for releasably locking a seat supporting slide in slidably adjusted relation to a stationary support, said latch member comprising an elongated substantially horizontal spring wire body having one integral end portion bent laterally to form a substantially horizontal supporting end portion adapted for rigid connection with the slide, and having another integral portion spaced appreciably from said one end portion bent downwardly to form a substantially vertical latch pin portion adapted to have releasable locking engagement in notches provided in the support, the free end portion of said latch pin portion being bent forwardly to form a substantially horizontal operating end portion by means of which the latch member is adapted to be deflected to release it from locking engagement with the support, the operating end portion being extended to include a handle portion adapted to project forwardly from the seat for manual operation, the handle portion including a rearwardly bent end portion having a downwardly bent extremity adapted to be pivotally engaged on the slide, the rearwardly bent end portion including an integral stop pin portion adapted by abutment with the seat slide to positively limit deflection of said latch member in its release movement.

11. As an article of manufacture, a spring wire latch member for releasably locking a seat supporting slide in slidably adjusted relation to a stationary support, said latch member comprising an elongated substantially horizontal spring wire body having one integral end portion bent laterally to form a substantially horizontal supporting end portion adapted for rigid connection with the slide, and having another integral portion spaced appreciably from said end portion bent downwardly to form a substantially vertical latch pin portion adapted to have releasable locking engagement in notches provided in the support, the free end portion of said latch pin portion being bent forwardly to form a substantially horizontal operating end portion by means of which the latch member is adapted to be deflected to release it from locking engagement with the support, the operating end portion being extended to include a handle portion adapted to project forwardly from the seat for manual operation, the handle portion including a rearwardly bent end portion having a downwardly bent extremity adapted to be pivotally engaged on the slide, the rearwardly bent end portion including an integral stop pin portion adapted by abutment with the seat slide to positively limit deflection of said latch member in its release movement, and also including an eye onto which may be connected a cross-link for operating another latch member on a companion seat slide.

AGNAR JOHNSON.

References Cited in the file of this patent
UNITED STATES PATENTS

| Number | Name | Date |
|---|---|---|
| 438,131 | Altman | Oct. 14, 1890 |
| 603,633 | Green | May 10, 1898 |
| 1,056,956 | Stewart | Mar. 25, 1913 |
| 2,278,101 | Brown | Mar. 31, 1942 |
| 2,351,778 | Moulding | June 20, 1944 |